(12) United States Patent
Lahia

(10) Patent No.: US 12,254,359 B2
(45) Date of Patent: Mar. 18, 2025

(54) DATA PROCESSING UTILIZING AN ASYNCHRONOUS COMMUNICATION REPOSITORY

(71) Applicant: Amadeus S.A.S., Biot (FR)

(72) Inventor: M'hammed Lahia, Mandelieu la Napoule (FR)

(73) Assignee: Amadeus S.A.S., Biot (FR)

( * ) Notice: Subject to any disclaimer, the term of this patent is extended or adjusted under 35 U.S.C. 154(b) by 440 days.

(21) Appl. No.: 17/956,976

(22) Filed: Sep. 30, 2022

(65) Prior Publication Data

US 2023/0108982 A1    Apr. 6, 2023

(30) Foreign Application Priority Data

Oct. 1, 2021  (EP) ..................... 21306381

(51) Int. Cl.
*G06F 9/54*      (2006.01)
(52) U.S. Cl.
CPC ................. *G06F 9/542* (2013.01)
(58) Field of Classification Search
CPC ...... G06F 9/541; G06F 9/542; G06F 16/1734; G05B 2219/36037; H04L 41/06; H04L 41/0604
See application file for complete search history.

(56) References Cited

U.S. PATENT DOCUMENTS

| 11,275,726 B1 * | 3/2022 | Mikhtoniuk ........ G06F 16/2379 |
| 11,663,356 B1 * | 5/2023 | Vernon Sahayam ....................... G06F 21/6218 726/27 |
| 2019/0220331 A1 | 7/2019 | Duggal et al. |

OTHER PUBLICATIONS

Kreps, Jay, "Putting Apache Kafka to Use: A Practical Guide to Building an Event Streaming Platform (Part 1)," Confluent, available at https://www.confluent.io/blog/event-streaming-platform-1/, 14 pages (Feb. 25, 2015).

* cited by examiner

*Primary Examiner* — Andy Ho
(74) *Attorney, Agent, or Firm* — Thompson Hine LLP

(57) ABSTRACT

Methods, systems, and computer program products for data processing utilizing an asynchronous communication repository. Instructions are received at a first event publisher to publish a first dataset. The instructions include a directive to retrieve a second dataset published by a second event publisher, a directive to determine a first metadata structure including attributes describing the first dataset, and a directive to send the first metadata structure to an asynchronous communication repository for storage. A second metadata structure describing the second dataset is received at the first event publisher from the asynchronous communication repository using an asynchronous communication protocol. The second dataset is retrieved at the first event publisher from the second event publisher. The first dataset is generated based on the second dataset. The first metadata structure is determined based on the first dataset. The first metadata structure is sent from the first event publisher to the asynchronous communication repository.

20 Claims, 5 Drawing Sheets

DATA PROCESSING UTILIZING AN ASYNCHRONOUS COMMUNICATION REPOSITORY

TECHNICAL FIELD

The present invention generally relates to computers and computer software, and more specifically, to methods, systems, and computer program products for data processing utilizing an asynchronous communication repository.

BACKGROUND

Event streaming platforms (ESP) play a central role in ingesting, storing, and processing real-time data in a scalable and resilient manner. Example environments that need ESPs for a big data pipeline include the travel industry, financial transactions, application logs, website clickstreams, IoT telemetry data, and the like. An ESP is a highly scalable and durable system capable of continuously ingesting gigabytes of events per second from various sources. The data collected is available in milliseconds for intelligent applications that can react to events as they happen. The ultimate goal of an ESP is to capture business events as they happen and react to them in real-time to deliver responsive and personalized customer experiences. An ESP can ingest data from various data sources such as website clickstreams, database event streams, financial transactions, social media feeds, server logs, and events coming from IoT devices. The captured data must be made available to applications that know how to process them to gain real-time actionable insights.

For example, controlled experiments, such as A|B testing, may utilize an ESP. A|B testing is used to enable updates to current systems or new features to be objectively evaluated while minimizing the risks associated with full deployment. In A|B testing, for example, an update or a new feature of a system being tested (hereinafter "version B") may be objectively evaluated against a current version (hereinafter "version A"). Users interacting with the system under test may be partitioned such that a first subset of the users are presented with version A while a second subset of the users are presented with version B. Evaluation metrics may be determined for each version using data collected regarding responses or behaviors of users in the first and second subsets. Such evaluation metrics facilitate objectively evaluating version B against version A.

Some conventional techniques for automating big data pipelines for processing use static configuration files and an orchestrator that can control each run sequence based on the predefined static configuration file. The static configuration file includes a defined run sequence, including run frequencies for each job in the run sequence. Issues with using static configuration files include the use and dependency of a centralized entity (e.g., an orchestrator). Additionally, the static configuration files can be too big, making them hard to manage, more expensive, and with limited scalability. Therefore, complex jobs, such as A|B testing with multiple dependencies, will make the static configuration files very big, and hard to maintain.

For data processing services that involve a big data pipeline, fulfilling service requests and run sequences in a big data environment with a massive influx of real-time data may include several hurdles to maintain efficient processes because of the complexities of the building and maintaining of heavy batch big data processes. Thus, improved methods, systems, and computer program products for simplification of the building and maintaining of heavy batch big data processes are needed.

SUMMARY

In embodiments of the invention, a method for implementing an asynchronous communication protocol between event publishers and an asynchronous communication repository. The method includes receiving, at a first event publisher, a first plurality of publication instructions to publish a first dataset. The first plurality of publication instructions include a directive to retrieve a second dataset published by a second event publisher, a directive to determine a first metadata structure including a plurality of first attributes describing the first dataset, and a directive to send the first metadata structure to an asynchronous communication repository for storage. The asynchronous communication repository is configured to store a second metadata structure including a plurality of second attributes describing the second dataset. The method further includes receiving, at the first event publisher via an event application program interface (API), the second metadata structure from the asynchronous communication repository using an asynchronous communication protocol. The method further includes retrieving, at the first event publisher and based on the second attributes describing the second metadata structure, the second dataset from the second event publisher. The method further includes generating, at the first event publisher, the first dataset based on the second dataset. The method further includes determining, at the first event publisher, the first metadata structure based on the first dataset. The method further includes sending the first metadata structure from the first event publisher to the asynchronous communication repository via the event API.

These and other embodiments can each optionally include one or more of the following features.

In some embodiments of the invention, the asynchronous communication protocol includes a directive to only store, at the asynchronous communication repository, the first metadata structure determined based on a most-recently published first dataset.

In some embodiments of the invention, the first metadata structure and the second metadata structure each include attributes including a version, a time period, a dataset name, a path location, a dataset format, or a combination thereof. In some embodiments of the invention, the attributes of the first metadata structure and the attributes of the second metadata structure are different. In some embodiments of the invention, the first dataset is published multiple times based on a run frequency, and the method further includes updating the attributes of the first metadata structure based on a most-recently published first dataset.

In some embodiments of the invention, the first plurality of publication instructions further include a directive to retrieve a third dataset published by a third event publisher, the asynchronous communication repository is further configured to store a third metadata structure including a plurality of third attributes describing the third dataset, and the method further including receiving, at the first event publisher via the API, the third metadata structure from the asynchronous communication repository using the asynchronous communication protocol, retrieving, at the first event publisher and based on the third attributes describing the third metadata structure, the third dataset from the third event publisher, where the first dataset is generated based on the second dataset and the third dataset.

In some embodiments of the invention, the first plurality of publication instructions further include a first run frequency at which to publish the first dataset. In some embodiments of the invention, the publication instructions are a first set of publication instructions, the run frequency is a first run frequency, and the method further including receiving, at the first event publisher, a second set of publication instructions to publish an updated first dataset, wherein the second set of publication instructions include a second run frequency that is different from the first run frequency. In some embodiments of the invention, the first metadata structure includes attributes including a version, a time period, a dataset name, a path location, a dataset format, or a combination thereof, and the method further including updating the attributes of the first metadata structure based on an updated first dataset.

In embodiments of the invention, a computing apparatus for implementing an asynchronous communication protocol between event publishers and an asynchronous communication repository. The computing apparatus includes one or more processors, at least one memory device coupled with the one or more processors, and a data communications interface operably associated with the one or more processors. The at least one memory device contains a plurality of program instructions that, when executed by the one or more processors, cause the including apparatus to perform operations. The operations include receive, at a first event publisher, publication instructions to publish a first dataset. The publication instructions include a directive to retrieve a second dataset published by a second event publisher, a directive to determine a first metadata structure including a plurality of first attributes describing the first dataset, and a directive to send the first metadata structure to an asynchronous communication repository for storage. The asynchronous communication repository is configured to store a second metadata structure including a plurality of second attributes describing the second dataset. The operations further include receive, at the first event publisher via an event application program interface (API), the second metadata structure from the asynchronous communication repository using an asynchronous communication protocol. The operations further include retrieve, at the first event publisher and based on the second attributes describing the second metadata structure, the second dataset from the second event publisher. The operations further include generating, at the first event publisher, the first dataset based on the second dataset. The operations further include determine, at the first event publisher, the first metadata structure based on the first dataset. The operations further include send the first metadata structure from the first event publisher to the asynchronous communication repository via the event API.

In embodiments of the invention, a non-transitory computer storage medium encoded with a computer program, the computer program including a plurality of program instructions that when executed by one or more processors cause the one or more processors to perform operations. The operations include receive, at a first event publisher, publication instructions to publish a first dataset. The publication instructions include a directive to retrieve a second dataset published by a second event publisher, a directive to determine a first metadata structure including a plurality of first attributes describing the first dataset, and a directive to send the first metadata structure to an asynchronous communication repository for storage. The asynchronous communication repository is configured to store a second metadata structure including a plurality of second attributes describing the second dataset. The operations further include receive, at the first event publisher via an event application program interface (API), the second metadata structure from the asynchronous communication repository using an asynchronous communication protocol. The operations further include retrieve, at the first event publisher and based on the second attributes describing the second metadata structure, the second dataset from the second event publisher. The operations further include generating, at the first event publisher, the first dataset based on the second dataset. The operations further include determine, at the first event publisher, the first metadata structure based on the first dataset. The operations further include send the first metadata structure from the first event publisher to the asynchronous communication repository via the event API.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
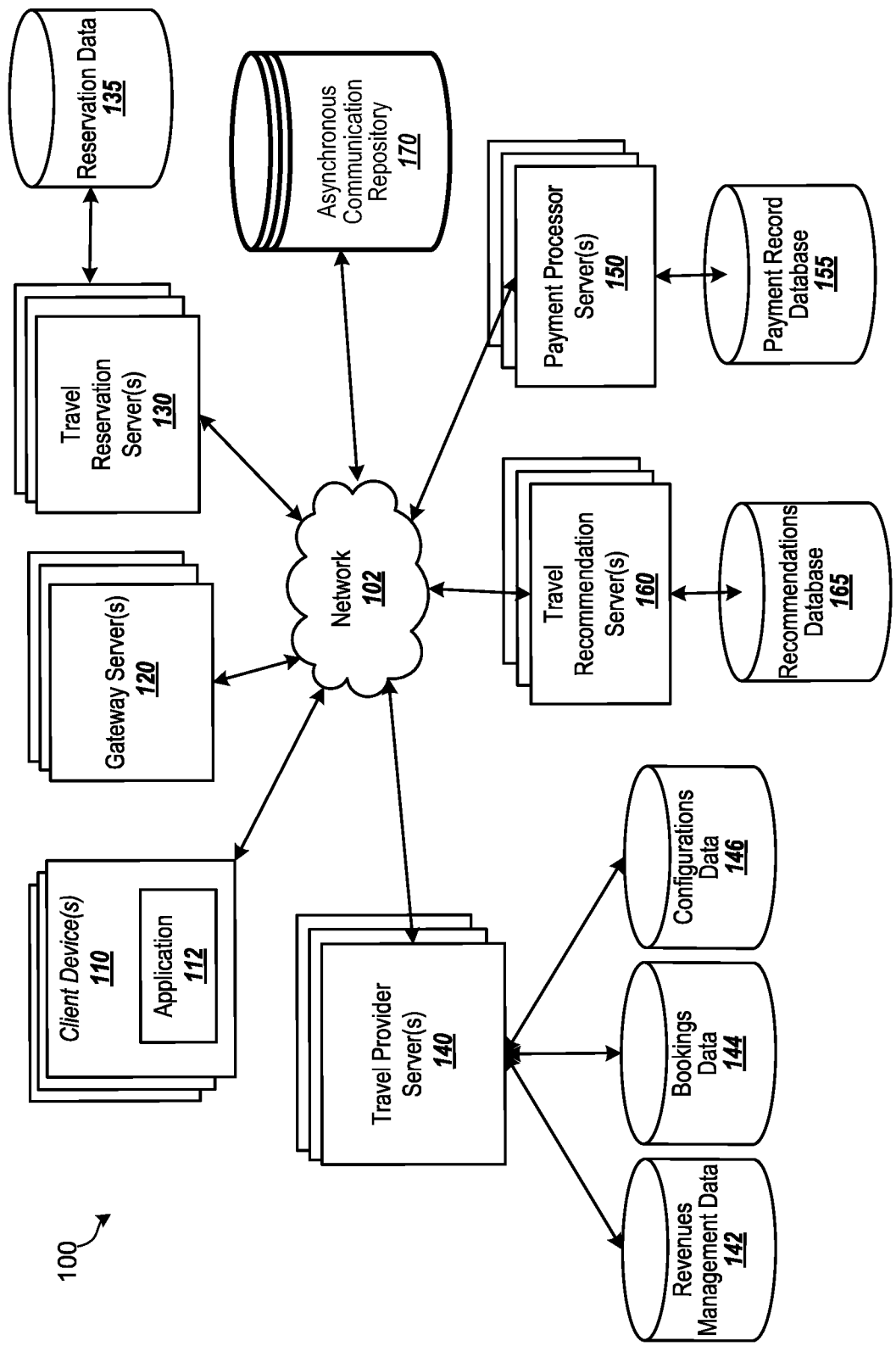
FIG. 1 illustrates an example environment utilizing an asynchronous communication repository, according to embodiments of the invention.

For data processing services that involve a big data pipeline, fulfilling service requests and run sequences in a big data environment with a massive influx of real-time data may include several hurdles to maintain efficient processes because of the complexities of the building and maintaining of heavy batch big data processes. Thus, according to embodiments of the invention, simplification of the building and maintaining of heavy batch big data processes may be achieved by removing the complexity of a fixed configuration file and replacing the fixed configuration file with dynamic metadata shared storage that acts as an event stream. The processes themselves can maintain their batching properties and will not process data in real time because the processes described herein are focused on the way they are launched.

Event streaming platforms (ESP) play a central role in ingesting, storing, and processing real-time data in a scalable and resilient manner. Example environments that need ESPs for a big data pipeline include the travel industry, financial transactions, application logs, website clickstreams, IoT telemetry data, and the like. An ESP is a highly scalable and durable system capable of continuously ingesting gigabytes of events per second from various sources. The data collected is available in milliseconds for intelligent applications that can react to events as they happen. The ultimate goal of an ESP is to capture business events as they happen and react to them in real-time to deliver responsive and personalized customer experiences. An ESP can ingest data from various data sources such as website clickstreams, database event streams, financial transactions, social media feeds, server logs, and events coming from IoT devices. The captured data must be made available to applications that know how to process them to gain real-time actionable insights.

For example, controlled experiments, such as A|B testing, may utilize an ESP. A|B testing is used to enable updates to current systems or new features to be objectively evaluated while minimizing the risks associated with full deployment. In A|B testing, for example, an update or a new feature of a system being tested (hereinafter "version B") may be objectively evaluated against a current version (hereinafter "version A"). Users interacting with the system under test may be partitioned such that a first subset of the users are presented with version A while a second subset of the users are presented with version B. Evaluation metrics may be determined for each version using data collected regarding responses or behaviors of users in the first and second subsets. Such evaluation metrics facilitate objectively evaluating version B against version A.

Some conventional techniques for automating big data pipelines for processing use static configuration files and an orchestrator that can control each run sequence based on the predefined static configuration file. The static configuration file includes a defined run sequence, including run frequencies for each job in the run sequence. Issues with using static configuration files include the use and dependency of a centralized entity (e.g., an orchestrator). Additionally, the static configuration files can be too big, making them hard to manage, more expensive, and with limited scalability. Therefore, complex jobs, such as A|B testing with multiple dependencies, will make the static configuration files very big, and hard to maintain. Thus, the example embodiments of the invention described herein, utilize an asynchronous communication repository as a common interface that stores small metadata structures that contain only information describing what has been produced by the issuing process.

FIG. 1 is an example environment 100 of an example environment 100 utilizing asynchronous communication repository, according to embodiments of the invention. The example environment 100 includes a client device 110, one or more gateway server(s) 120, one or more travel reservation server(s) 130, one or more travel provider server(s) 140, one or more payment processor server(s) 150, one or more recommendation server(s) 160, and an asynchronous communication repository 170 that communicate over a data communication network 102, e.g., a local area network (LAN), a wide area network (WAN), the Internet, a mobile network, or a combination thereof.

The client device 110 (e.g., a device used by a requestor) can include a desktop, a laptop, a server, or a mobile device, such as a smartphone, tablet computer, wearable device (e.g., smartwatch), in-car computing device, and/or other types of mobile devices. The client device 110 includes applications, such as the application 112, for managing the travel request to the one or more travel reservation server(s) 120 via the gateway server(s) 120. The client device 110 can include other applications. The client device 110 initiates a travel request by a requestor via application 112. The travel request may include availability search queries by requesting entities (such as clients, applications, browsers installed on user terminals, etc.) in the course of a search (e.g., airline booking search). A requestor of a travel request may include an airline agency, travel agency, metasearch engine, other dedicated global distribution systems (GDS), as for example airlines reservation systems which provide flight search applications for shopping business like flight booking, and the like.

The management protocols of gateway server 120 may be based on a redundant load-balancing system by managing multiple clients (e.g., client device(s) 110) so that a travel booking and/or an availability travel request is handled by one of the one or more of the travel reservation server(s) 130 or the one or more of the travel recommendation server(s) 160 that provide travel recommendations and stores prior recommendations in a recommendations database 165. For example, there may be multiple travel reservation server(s) 130 that are able to service the request, and the redundant load-balancing system of the gateway server(s) 120 is responsible for ensuring that a travel request is performed by one of the capable travel reservation server(s) 130.

The one or more travel provider server(s) 140 receives and processes travel inventory data such as revenue data stored in a revenues management database 142 from one or more revenue management system(s), bookings data stored in a bookings database 144 from one or more bookings management system(s), airlines/system configurations data from a configurations database 136 from one or more airlines/system configurations management system(s), and the like. The one or more travel recommendation server(s) 160 generates travel recommendations based on the travel inventory data from the multiple sources (e.g., revenues management database 142, bookings database 144, configurations database 146, etc.), and stores the travel recommendations in a recommendations database 165.

One or more gateway server(s) 120 may be used as front end server(s) for managing, collecting, processing, and communicating availability queries, resource information, revenues management data, bookings data, airlines/system configurations data, etc., that is stored in the travel databases (e.g., revenues management database 142, bookings database 144, configurations database 146, etc.). Further, the gateway server(s) may be front end server(s) for managing, collecting, processing, and communicating availability results from one or more travel reservation server(s) 130 to the client devices 110 via application 112. In an exemplary embodiment, for an airline booking example, the gateway server(s) may be front end server(s) for collecting, processing, and storing travel information (e.g., flight schedules, flight information such as such as departure and destination airport, airline, departure and return dates, fares, booking classes, passenger information, and the like) from a plurality of external travel systems (e.g., airport information systems, airline information systems, third-party intermediator systems, etc.) via the one or more travel reservation server(s) 130, the one or more travel provider server(s) 140, and/or the one or more travel recommendation server(s) 160.

Additionally, the management protocols of the one or more gateway server(s) 120 may be based on a redundant load-balancing system by managing multiple clients (e.g., client device(s) 110) so that a payment associated with a travel booking request is handled by one of the one or more payment processor server(s) 150. For example, there may be multiple payment processor server(s) 150 that are able to service the travel booking payment, and the redundant load-balancing system of the payment gateway server(s) 140 is responsible for ensuring that the travel booking request is performed by one of the capable payment processor server(s) 150. Payment processors include for example, a credit/debit card issuer, a bank, digital payment service, etc., and store payment information in the payment record database 155. The one or more servers for each payment processor generally facilitate remote communication therewith to authenticate and/or authorize a payment via a payment gateway server.

The asynchronous communication repository 170 is a data repository that stores meta data for each "event" generated by the one or more event publishers (e.g., the one or more travel reservation server(s) 130, one or more travel provider server(s) 140, one or more payment processor server(s) 150, one or more recommendation server(s) 160, etc.). The asynchronous communication repository 170 provides a common interface to each event publisher to communicate each entities' metadata regarding each published event. For example, the asynchronous communication repository 170 is an example event streaming platform (ESP) that plays a central role in ingesting, storing, and processing real-time data for the example environment 100. The asynchronous communication repository 170 is utilized as a common interface that stores small metadata structures that contain only information describing what has been produced by the issuing process. For example, the travel recommendations server(s) 160 may rely on updated batches of travel information from the travel provider server(s) 140 from each of the databases. Instead of directly communicating with a travel provider server 140, a travel recommendation server can pull the metadata structure associated with the relevant dataset needed to generate a travel recommendation (e.g., bookings data from the bookings database 144).

The metadata structures stored in the asynchronous communication repository 170 may include a version, a time period (e.g., start time/end time), a dataset name, a path location, and a dataset format. According to embodiments of the invention, these attributes are a minimum version of an example metadata structure. Alternatively, the metadata structure can contain more information, and the metadata structure can evolve over time (e.g., add or remove some attributes). According to embodiments of the invention, metadata structure is a relatively small data packet that contains only information describing what has been produced by the issuing process, and does not contain any actual business data (e.g., data related to the functional scope of where the system is being used).

According to embodiments of the invention, the asynchronous communication repository 170 stores events in a provided order, but the asynchronous communication repository 170 does not control the process. The asynchronous communication repository 170 only stores the metadata structure from the various publishing entities in order to streamline and the simplify the communication processes between each entity. For example, each publishing entity (e.g., each travel server, also referred to herein as an event publisher) receives access to each metadata structure from the asynchronous communication repository 170 to decide what to do with the information contained with the metadata structures (if anything). Each event publisher (publishing entity) has access to all the metadata structures stored in the asynchronous communication repository 170. Thus, data may be shared with the asynchronous communication repository 170 through a common event application program interface (API) based on an asynchronous communication protocol (e.g., data can be transmitted intermittently rather than in a steady stream).

Figure 2:
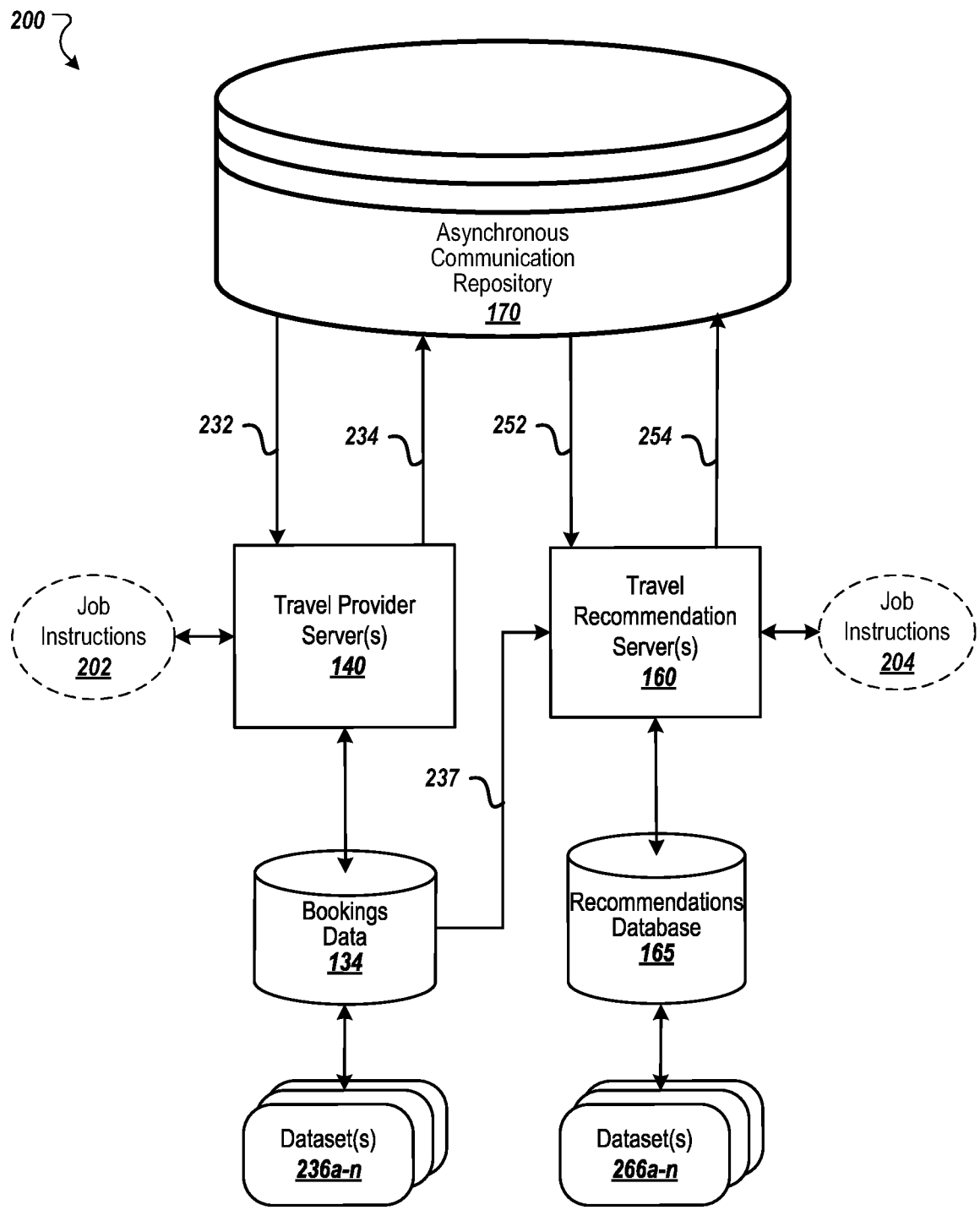
FIG. 2 illustrates example asynchronous communication between two event publishers and an asynchronous communication repository, according to embodiments of the invention.
Figure 3:
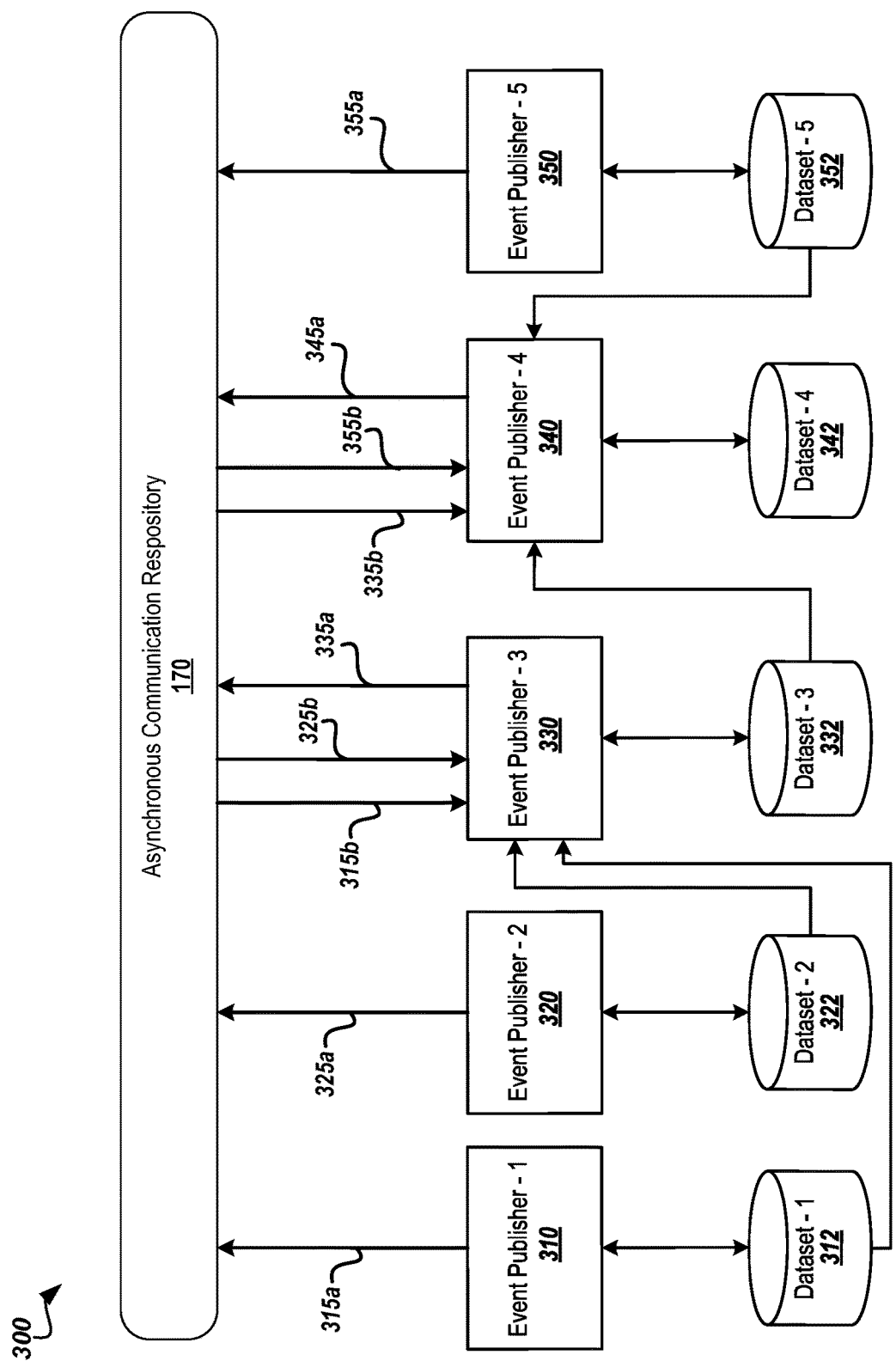
FIG. 3 illustrates example asynchronous communication between a plurality of event publishers and an asynchronous communication repository, according to embodiments of the invention.

Example illustrations for event processing between event publishers and an asynchronous communication repository 170 are illustrated in FIGS. 2 and 3. Example processes for providing an asynchronous communication protocol between event publishers and an asynchronous communication repository that are illustrated in FIG. 1 are further discussed herein with reference to process 400 of FIG. 4.

FIG. 2 illustrates an example environment 200 for asynchronous communication between two event publishers and an asynchronous communication repository, according to embodiments of the invention. In particular, FIG. 2 illustrates a first event publisher (travel provider server 140) and a second event publisher (travel recommendation server 160) processing datasets based on publication instructions (e.g., job instructions 202, 204, respectively) and communicating metadata regarding each respective produced dataset via the asynchronous communication repository 170. For example, travel provider server 140, based on received job instructions 202, generates dataset(s) 236*a*-*n* that are stored in the bookings database 134, and travel recommendation server 160, based on received job instructions 204, generates dataset(s) 266*a*-*n* that are stored in the recommendations database 165.

Additionally, each event publisher (travel provider server 140 and travel recommendation server 160) sends and receives metadata structures to and from the asynchronous communication repository 170 based on the published datasets. For example, travel provider server 140 may receive metadata structures from other event publishers regarding published datasets via communication link 232, and travel provider server 140 may upload a metadata structure for each published dataset (e.g., dataset 236*a*) via communication link 234. Additionally, travel recommendation server 160 may receive metadata structures from other event publishers regarding published datasets via communication link 252, and travel recommendation server 160 may upload a metadata structure for each published dataset (e.g., dataset 266*a*) via communication link 254. As discussed herein, the metadata structures stored in the asynchronous communication repository 170 may include a version, a time period (e.g., start time/end time), a dataset name, a path location, and a dataset format. According to embodiments of the invention, these attributes are a minimum version of an example metadata structure. Alternatively, the metadata structure can contain more information, and the metadata structure can evolve over time (e.g., add or remove some attributes).

The example environment 200 provides an example for asynchronous communication between two event publishers that allows each event publisher to be free to scan through all events and finds relevant ones to process. For example, each event publisher (travel provider server 140 and travel recommendation server 160) can choose which dataset is needed to process their own datasets. For example, as illustrated at communication link 237, travel recommendation server 160 determines, based on the acquired metadata structure received at communication link 252, which dataset of datasets 236*a*-*n* to acquire from the bookings database 134 based on the metadata structure. Thus, each event publisher is responsible of emitting a metadata structure describing the produced dataset, so that other event publishers know they can use that dataset when they acquire the associated metadata structure stored in the asynchronous communication repository 170.

According to embodiments of the invention, the job instructions 202, 204 may include a directive to retrieve a second dataset published by a second event publisher, a directive to determine a first metadata structure including a plurality of first attributes describing the first dataset, and a directive to send the first metadata structure to the asynchronous communication repository 170 for storage. For example, a directive in the job instructions 204, may request the travel recommendation server 160 to pull the most recent dataset from datasets 236a-n published by the travel provider server 140 by accessing metadata structures via the asynchronous communication repository 170.

Moreover, according to embodiments of the invention, the job instructions 202, 204 may include a run frequency such that each event publisher would know when to publish each dataset of the plurality of datasets at a determined time interval. For example, each dataset is generated based on the run frequency, independent of waiting for an updated job/dataset to be completed by another publisher. Each dataset instance needs its dependencies to be generated, only then the job can successfully build the new dataset instance. In some implementations, the run sequence may be independent from the other publishers, but it does not define the generated dataset frequency. For example, a process can depend on two daily datasets, to generate a third one, but the frequency can be hourly if the system architect wanted to have faster reaction time.

FIG. 3 illustrates an example environment 300 for asynchronous communication between a plurality of event publishers and an asynchronous communication repository, according to embodiments of the invention. Example environment 300 is similar to example environment 200 regarding the asynchronous communication protocols but includes additionally event publishers to illustrate an example data process flow.

In particular, FIG. 3 illustrates five different event publishers (310, 320, 330, 340, and 350) processing respective datasets (312, 322, 332, 342, 352) based on respective instructions sets, and communicating metadata regarding each respective produced dataset via the asynchronous communication repository 170. For example, event publisher-1 310, per job instructions received, generates dataset-1 312, and sends an associated metadata structure via communication link 315a to the asynchronous communication repository 170 that specifies details associated with the generated dataset-1 312 (e.g., a version, a time period, a dataset name, a path location, a dataset format, etc.). Similarly, event publisher-2 320, per job instructions received, generates dataset-2 322, and sends an associated metadata structure via communication link 325a to the asynchronous communication repository 170 that specifies details associated with the generated dataset-1 322 (e.g., a version, a time period, a dataset name, a path location, a dataset format, etc.). Similarly, event publisher-5 350, per job instructions received, generates dataset-5 352, and sends an associated metadata structure via communication link 355a to the asynchronous communication repository 170 that specifies details associated with the generated dataset-1 352 (e.g., a version, a time period, a dataset name, a path location, a dataset format, etc.).

Event publisher-3 330, per job instructions received, determines that event publisher-3 330 will need datasets from event publisher-1 310 and event publisher-2 320. Thus, event publisher-3 330 acquires the associated metadata structures from asynchronous communication repository 170 via communication link 315b (associated with event publisher-1 310) and communication link 325b (associated with event publisher-2 320), and based on the associated metadata structures, the event publisher-3 330 determines which datasets to acquire from event publisher-1 310 and event publisher-2 320. After acquiring the latest datasets as specified by the metadata structures from event publisher-1 310 and event publisher-2 320, event publisher-3 330 generates dataset-3 332, and sends an associated metadata structure via communication link 335a to the asynchronous communication repository 170 that specifies details associated with the generated dataset-3 332 (e.g., a version, a time period, a dataset name, a path location, a dataset format, etc.).

Event publisher-4 340, per job instructions received, determines that event publisher-4 340 will need datasets from event publisher-3 330 and event publisher-5 350. Thus, event publisher-4 340 acquires the associated metadata structures from asynchronous communication repository 170 via communication link 335b (associated with event publisher-3 330) and communication link 355b (associated with event publisher-5 350), and based on the associated metadata structures, the event publisher-4 340 determines which datasets to acquire from event publisher-3 330 and event publisher-5 350. After acquiring the latest datasets as specified by the metadata structures from event publisher-3 330 and event publisher-5 350, event publisher-4 340 generates dataset-4 342, and sends an associated metadata structure via communication link 345a to the asynchronous communication repository 170 that specifies details associated with the generated dataset-4 342 (e.g., a version, a time period, a dataset name, a path location, a dataset format, etc.).

For example, event publisher-4 340 may be an A|B testing server for controlled experiments, such as A|B testing, that may utilize the event streaming platform (ESP) such as environment 300 utilizing the asynchronous communication repository 170 via an asynchronous communication protocol. A|B testing is used to enable updates to current systems or new features to be objectively evaluated while minimizing the risks associated with full deployment. Thus, instead of using conventional techniques for automating big data pipelines as illustrated in environment 300 for processing data events using static configuration files and an orchestrator to control each run sequence based on the predefined static configuration file, the environment 300 utilizes an asynchronous communication protocol. Thus, static configuration files which may include a defined run sequence, including run frequencies for each job in the run sequence, are not needed. Issues with using static configuration files include the use and dependency of a centralized entity (e.g., an orchestrator). Additionally, the static configuration files can be too big, making them hard to manage, more expensive, and with limited scalability. Therefore, complex jobs, such as A|B testing with multiple dependencies (e.g. depending on dataset-3 332 from event publisher-3 330, and dataset-5 352 from event publisher-5 350), would make the static configuration files very big, and hard to maintain. Thus, the asynchronous communication protocol between multiple event publishers allows each event publisher to be free to scan through all events and find relevant datasets to process based on the metadata structures stored in the asynchronous communication repository 170.

Figure 4:
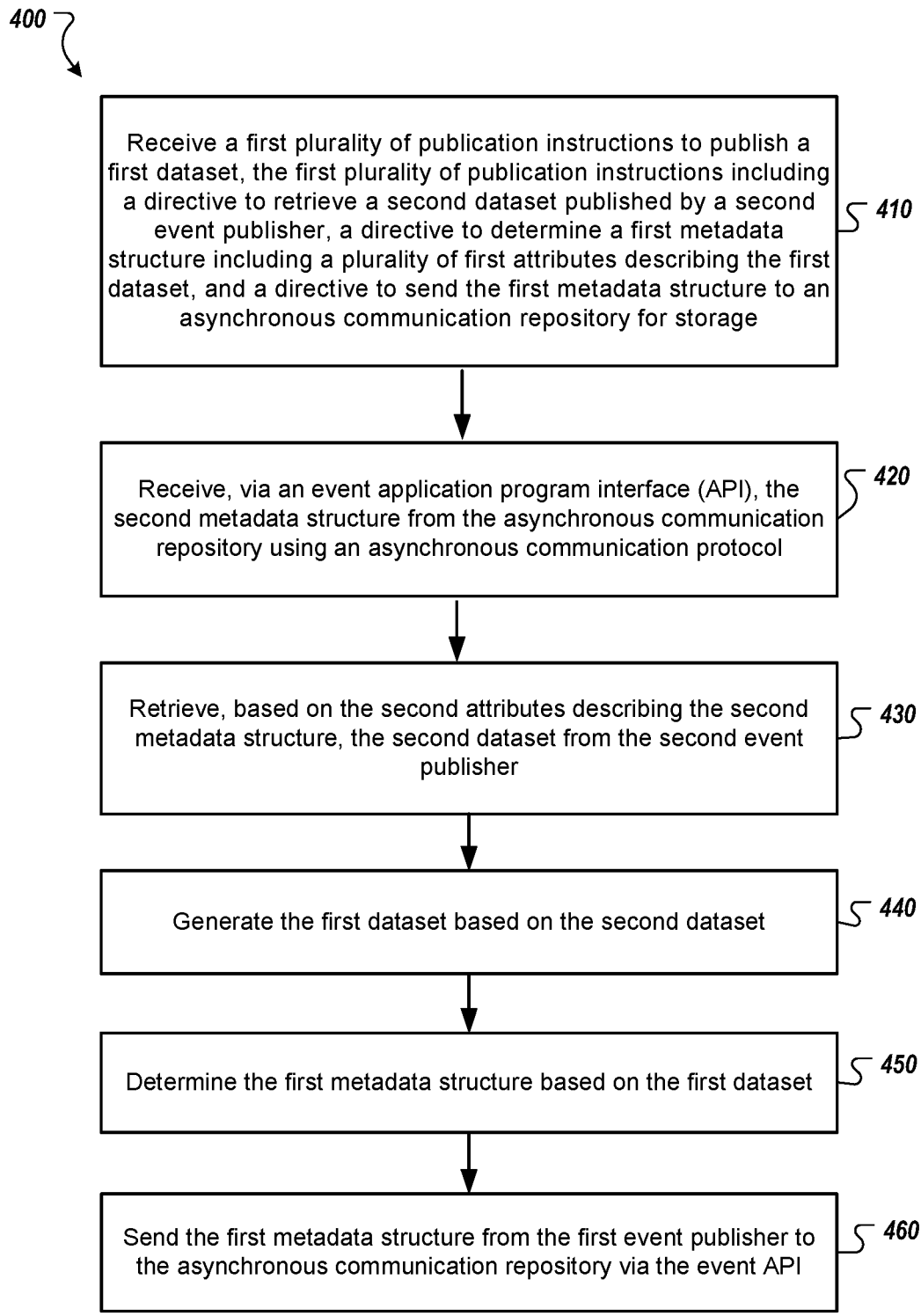
FIG. 4 is a flowchart of an example process for providing an asynchronous communication protocol between event publishers and an asynchronous communication repository, according to embodiments of the invention.

FIG. 4 illustrates a flowchart of an example process 400 for implementing an asynchronous communication protocol between event publishers and an asynchronous communication repository, according to embodiments of the invention. Operations of the process 400 can be implemented, for example, by a system that includes one or more event publishers (e.g., travel recommendation server 160, or the like) and an asynchronous communication repository 170 of FIG. 1. The process 400 can also be implemented by instructions stored on computer storage medium, where execution of the instructions by a system that includes a data processing apparatus cause the data processing apparatus to perform the operations of the process 400.

The system receives, at a first event publisher, a first plurality of publication instructions to publish a first dataset, the first plurality of publication instructions including a directive to retrieve a second dataset published by a second event publisher, a directive to determine a first metadata structure including a plurality of first attributes describing the first dataset, and a directive to send the first metadata structure to an asynchronous communication repository for storage (410). In embodiments of the invention, the asynchronous communication repository is configured to store a second metadata structure including a plurality of second attributes describing the second dataset. For example, as illustrated in FIG. 2, the travel recommendation server 160, based on received job instructions 204, generates dataset(s) 266a-n that are stored in the recommendations database 165. According to embodiments of the invention, the job instructions 202, 204 may include a run frequency such that each event publisher would know when to publish each dataset of the plurality of datasets at a determined time interval. For example, each dataset is generated based on the run frequency, independent of waiting for an updated job/dataset to be completed by another publisher. Moreover, according to embodiments of the invention, the instructions 202, 204 may further include directives to access a dataset from one or more of the event publishers.

The system receives, via an event application program interface (API), the second metadata structure from the asynchronous communication repository using an asynchronous communication protocol (420). For example, as illustrated in FIG. 2, the travel recommendation server 160 may access a metadata structure associated with the travel provider server 140 via communication link 252 from the asynchronous communication repository 170 based on an asynchronous communication protocol (e.g., data can be transmitted intermittently rather than in a steady stream based on waiting for prior events to occur).

The system retrieves, based on the second attributes describing the second metadata structure, the second dataset from the second event publisher (430). For example, as illustrated in FIG. 2 at communication link 237, travel recommendation server 160 determines, based on the acquired metadata structure received at communication link 252, which dataset of datasets 236a-n to acquire from the bookings database 134 based on the metadata structure. Thus, each event publisher is responsible of emitting a metadata structure describing the produced dataset, so that other event publishers know they can use that dataset when they acquire the associated metadata structure stored in the asynchronous communication repository 170.

The system generates the first dataset based on the second dataset (440). For example, as illustrated in FIG. 2, the travel recommendation server 160, based on the received dataset from the travel provider server 140 (e.g., dataset 236a), generates a dataset (e.g., dataset 266a) and stores the dataset in the recommendations database 165.

The system determines the first metadata structure based on the first dataset (450) and sends the first metadata structure from the first event publisher to the asynchronous communication repository via the event API (460). For example, as illustrated in FIG. 2, after the travel recommendation server 160 generates the dataset 266a, the travel recommendation server 160 determines an associated metadata structure for that dataset, and sends an updated metadata structure via communication link 254 to the asynchronous communication repository 170.

In some implementations of the invention, the asynchronous communication protocol includes a directive to only store, at the asynchronous communication repository, the first metadata structure determined based on a most-recently published first dataset.

In some implementations of the invention, the first metadata structure and the second metadata structure each include attributes including a version, a time period, a dataset name, a path location, a dataset format, or a combination thereof. For example, attributes of a metadata structure may include at least one of a version, a time period (e.g., start time/end time), a dataset name, a path location, and a dataset format. According to embodiments of the invention, these attributes are a minimum version of an example metadata structure. Alternatively, the metadata structure can contain more information, and the metadata structure can evolve over time (e.g., add or remove some attributes). According to embodiments of the invention, metadata structure is a relatively small data packet that contains only information describing what has been produced by the issuing process, and does not contain any actual business data (e.g., data related to the functional scope of where the system is being used).

In some implementations of the invention, the attributes of the first metadata structure and the attributes of the second metadata structure are different. For example, each event publisher may include different attributes within the metadata structure. For example, a metadata message may require a minimal standard set of attributes to enable universal compatibility. For example, a version, a dataset name, a dataset type, and the like, can be an example of mandatory attributes. Then depending on the value of the dataset type, different additional attributes may be used to describe some specific dataset properties. For example, a dataset type may include a particular type of file name extension. Or, some additional attributes for dataset type file may include a format, a file name, and a file location, and the like. For a dataset type that is a table, some additional attributes or a different sets of attributes may include a database name, a table name, partition information, and the like.

In some implementations of the invention, the system updates the attributes of the first metadata structure based on a most-recently published first dataset. For example, as illustrated in FIG. 2, after the travel recommendation server 160 generates the dataset 266a, the travel recommendation server 160 determines an associated metadata structure for that dataset, and sends an updated metadata structure via communication link 254 to the asynchronous communication repository 170. In some implementations of the invention, the first metadata structure includes attributes including a version, a time period, a dataset name, a path location, a dataset format, or a combination thereof, and the process 400 further includes updating the attributes of the first metadata structure based on an updated first dataset.

In some implementations of the invention, the first plurality of publication instructions include a directive to retrieve a third dataset published by a third event publisher, and the asynchronous communication repository is further configured to store a third metadata structure including a plurality of third attributes describing the third dataset. For example, as illustrated in FIG. 3, event publisher-4 340, per job instructions received, determines that event publisher-4 340 will need datasets from event publisher-3 330 and event publisher-5 350. Thus, the process 400 may include receiving the third metadata structure from the asynchronous communication repository using the asynchronous communication protocol. Additionally, the process 400 may include retrieving, based on the third attributes describing the third metadata structure, the third dataset from the third event publisher, where Moreover, the first dataset is generated based on the second dataset and the third dataset. For example, as illustrated in FIG. 3, event publisher-4 340, per job instructions received, determines that event publisher-4 340 will need datasets from event publisher-3 330 and event publisher-5 350. Thus, event publisher-4 340 acquires the associated metadata structures from asynchronous communication repository 170 via communication link 335b (associated with event publisher-3 330) and communication link 355b (associated with event publisher-5 350), and based on the associated metadata structures, the event publisher-4 340 determines which datasets to acquire from event publisher-3 330 and event publisher-5 350. After acquiring the latest datasets as specified by the metadata structures from event publisher-3 330 and event publisher-5 350, event publisher-4 340 generates dataset-4 342, and sends an associated metadata structure via communication link 345a to the asynchronous communication repository 170 that specifies details associated with the generated dataset-4 342 (e.g., a version, a time period, a dataset name, a path location, a dataset format, etc.).

In some implementations of the invention, the first plurality of publication instructions further include a first run frequency at which to publish the first dataset. In some implementations of the invention, the process 400 may further include receiving a second plurality of publication instructions to publish an updated first dataset, where the second plurality of publication instructions includes a second run frequency that is different from the first run frequency. For example, an event publisher may receive publication instructions to compile a new dataset every two hours, but later receive new publication instructions to compile a new dataset every hour. This change would not need to be resent to each subsequent event publishers that relies on that dataset. Instead, the other event publishers would determine that there may be an updated dataset (e.g., based on the new run frequency) using the acquired metadata structure from the asynchronous communication repository 170.

Figure 5:
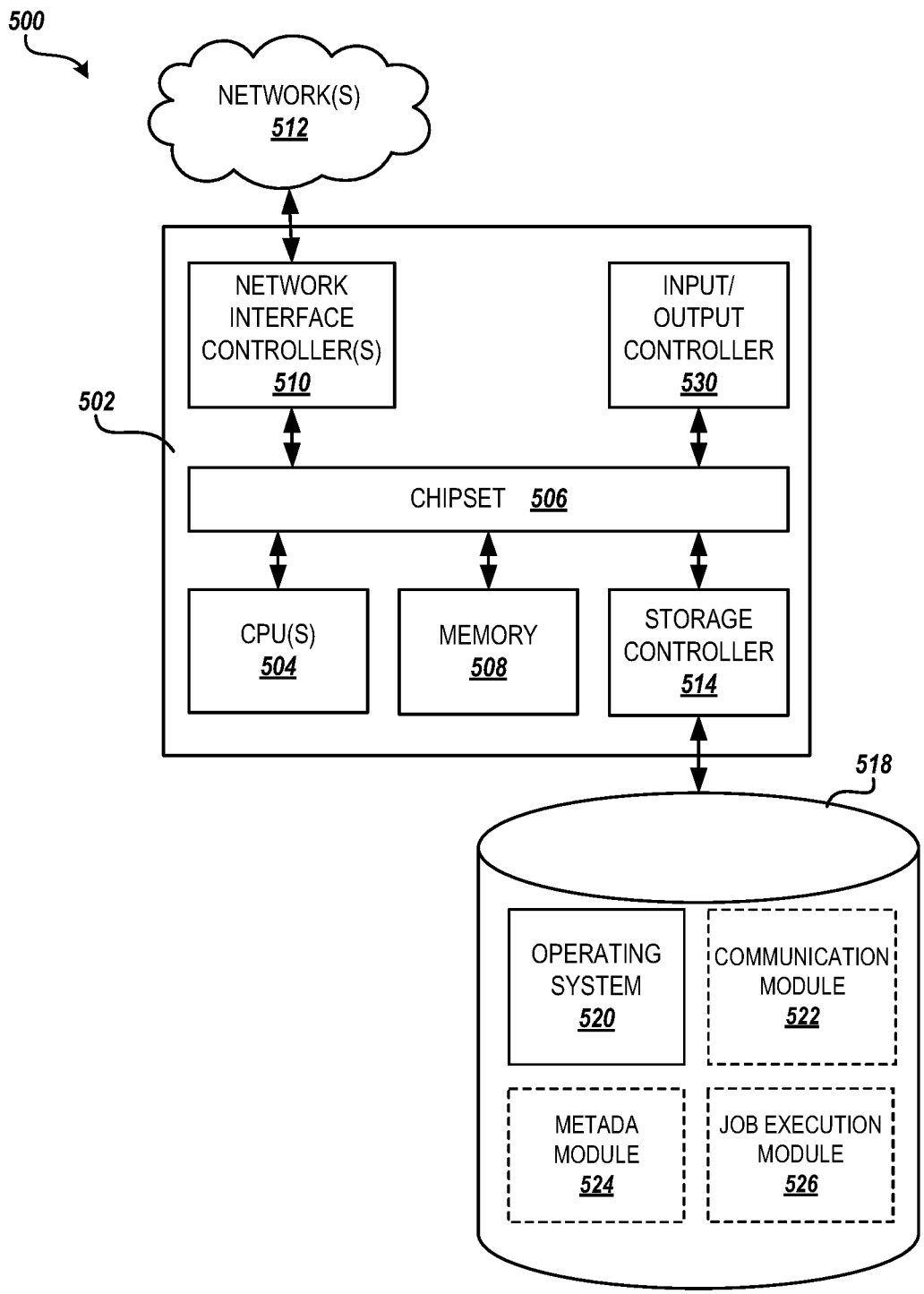
FIG. 5 is a block diagram showing an example computer architecture for a computer capable of executing the software components described herein, according to embodiments described herein.

FIG. 5 illustrates an example computer architecture 500 for a computer 502 capable of executing the software components described herein for the sending/receiving and processing of tasks for the CA components. The computer architecture 500 (also referred to herein as a "server") shown in FIG. 5 illustrates a server computer, workstation, desktop computer, laptop, or other computing device, and may be utilized to execute any aspects of the software components presented herein described as executing on a host server, or other computing platform. The computer 502 preferably includes a baseboard, or "motherboard," which is a printed circuit board to which a multitude of components or devices may be connected by way of a system bus or other electrical communication paths. In one illustrative embodiment, one or more central processing units (CPUs) 504 operate in conjunction with a chipset 506. The CPUs 504 can be programmable processors that perform arithmetic and logical operations necessary for the operation of the computer 502.

The CPUs 504 preferably perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 506 provides an interface between the CPUs 504 and the remainder of the components and devices on the baseboard. The chipset 506 may provide an interface to a memory 508. The memory 508 may include a random access memory (RAM) used as the main memory in the computer 502. The memory 508 may further include a computer-readable storage medium such as a read-only memory (ROM) or non-volatile RAM (NVRAM) for storing basic routines that that help to startup the computer 502 and to transfer information between the various components and devices. The ROM or NVRAM may also store other software components necessary for the operation of the computer 502 in accordance with the embodiments described herein.

According to various embodiments, the computer 502 may operate in a networked environment using logical connections to remote computing devices through one or more networks 512, a local-area network (LAN), a wide-area network (WAN), the Internet, or any other networking topology known in the art that connects the computer 502 to the devices and other remote computers. The chipset 506 includes functionality for providing network connectivity through one or more network interface controllers (NICs) 510, such as a gigabit Ethernet adapter. For example, the NIC 510 may be capable of connecting the computer 502 to other computer devices in the utility provider's systems. It should be appreciated that any number of NICs 510 may be present in the computer 502, connecting the computer to other types of networks and remote computer systems beyond those described herein.

The computer 502 may be connected to at least one mass storage device 518 that provides non-volatile storage for the computer 502. The mass storage device 518 may store system programs, application programs, other program modules, and data, which are described in greater detail herein. The mass storage device 518 may be connected to the computer 502 through a storage controller 514 connected to the chipset 506. The mass storage device 518 may consist of one or more physical storage units. The storage controller 514 may interface with the physical storage units through a serial attached SCSI (SAS) interface, a serial advanced technology attachment (SATA) interface, a fiber channel (FC) interface, or other standard interface for physically connecting and transferring data between computers and physical storage devices.

The computer 502 may store data on the mass storage device 518 by transforming the physical state of the physical storage units to reflect the information being stored. The specific transformation of physical state may depend on various factors, in different embodiments of the invention of this description. Examples of such factors may include, but are not limited to, the technology used to implement the physical storage units, whether the mass storage device 518 is characterized as primary or secondary storage, or the like. For example, the computer 502 may store information to the mass storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 502 may further read information from the mass storage device 518 by detecting the physical states or characteristics of one or more particular locations within the physical storage units.

The mass storage device 518 may store an operating system 520 utilized to control the operation of the computer 502. According to some embodiments, the operating system includes the LINUX operating system. According to another embodiment, the operating system includes the WINDOWS® SERVER operating system from MICROSOFT Corporation of Redmond, Wash. According to further embodiments, the operating system may include the UNIX or SOLARIS operating systems. It should be appreciated that other operating systems may also be utilized. The mass storage device 518 may store other system or application programs and data utilized by the computer 502, such as a communication module 522 to manage the communications between the even publishers and the asynchronous communication repository via an asynchronous communication protocol, a metadata module 524 to manage the metadata structures, and a job execution module 526 to execute a task, according to embodiments described herein.

In some embodiments, the mass storage device 518 may be encoded with computer-executable instructions that, when loaded into the computer 502, transforms the computer 502 from being a general-purpose computing system into a special-purpose computer capable of implementing the embodiments described herein. These computer-executable instructions transform the computer 502 by specifying how the CPUs 504 transition between states, as described above. According to some embodiments, from the availability determination server(s) 140 perspective, the mass storage device 518 stores computer-executable instructions that, when executed by the computer 502, perform portions of the process 400 for implementing an asynchronous communication protocol between event publishers and an asynchronous communication repository, as described herein. In further embodiments, the computer 502 may have access to other computer-readable storage medium in addition to or as an alternative to the mass storage device 518.

The computer 502 may also include an input/output controller 530 for receiving and processing input from a number of input devices, such as a keyboard, a mouse, a touchpad, a touch screen, an electronic stylus, or other type of input device. Similarly, the input/output controller 530 may provide output to a display device, such as a computer monitor, a flat-panel display, a digital projector, a printer, a plotter, or other type of output device. It will be appreciated that the computer 502 may not include all of the components shown in FIG. 5, may include other components that are not explicitly shown in FIG. 5, or may utilize an architecture completely different than that shown in FIG. 5.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically includes computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A computer-implemented method comprising:
receiving, at a first event publisher, a first plurality of publication instructions to publish a first dataset, the first plurality of publication instructions comprising a directive to retrieve a second dataset published by a second event publisher, a directive to determine a first metadata structure including a plurality of first attributes describing the first dataset, and a directive to send the first metadata structure to an asynchronous communication repository for storage, wherein the asynchronous communication repository is configured to store a second metadata structure including a plurality of second attributes describing the second dataset;
receiving, at the first event publisher via an event application program interface (API), the second metadata structure from the asynchronous communication repository using an asynchronous communication protocol;
retrieving, at the first event publisher and based on the second attributes describing the second metadata structure, the second dataset from the second event publisher;
generating, at the first event publisher, the first dataset based on the second dataset;
determining, at the first event publisher, the first metadata structure based on the first dataset; and
sending the first metadata structure from the first event publisher to the asynchronous communication repository via the event API.

2. The method of claim 1, wherein the asynchronous communication protocol comprises a directive to only store, at the asynchronous communication repository, the first metadata structure determined based on a most-recently published first dataset.

3. The method of claim 1, wherein the first metadata structure and the second metadata structure each include attributes comprising a version, a time period, a dataset name, a path location, a dataset format, or a combination thereof.

4. The method of claim 3, wherein the attributes of the first metadata structure and the attributes of the second metadata structure are different.

5. The method of claim 3, wherein the first dataset is published multiple times based on a run frequency, and further comprising:
updating the attributes of the first metadata structure based on a most-recently published first dataset.

6. The method of claim 1, wherein the first plurality of publication instructions further comprise a directive to retrieve a third dataset published by a third event publisher, the asynchronous communication repository is further configured to store a third metadata structure including a plurality of third attributes describing the third dataset, and further comprising:
receiving, at the first event publisher via the API, the third metadata structure from the asynchronous communication repository using the asynchronous communication protocol; and
retrieving, at the first event publisher and based on the third attributes describing the third metadata structure, the third dataset from the third event publisher, wherein the first dataset is generated based on the second dataset and the third dataset.

7. The method of claim 1, wherein the first plurality of publication instructions further include a first run frequency at which to publish the first dataset.

8. The method of claim 7, further comprising:
receiving, at the first event publisher, a second plurality of publication instructions to publish an updated first dataset, wherein the second plurality of publication instructions comprise a second run frequency that is different from the first run frequency.

9. The method of claim 8, wherein the first metadata structure includes attributes comprising a version, a time period, a dataset name, a path location, a dataset format, or a combination thereof, and further comprising:
updating the attributes of the first metadata structure based on the updated first dataset.

10. A computing apparatus comprising:
one or more processors;
at least one memory device coupled with the one or more processors; and
a data communications interface operably associated with the one or more processors,
wherein the at least one memory device contains a plurality of program instructions that, when executed by the one or more processors, cause the computing apparatus to:
receive, at a first event publisher, a first plurality of publication instructions to publish a first dataset, the first plurality of publication instructions comprising a directive to retrieve a second dataset published by a second event publisher, a directive to determine a first metadata structure including a plurality of first attributes describing the first dataset, and a directive to send the first metadata structure to an asynchronous communication repository for storage, wherein the asynchronous communication repository is configured to store a second metadata structure including a plurality of second attributes describing the second dataset;

receive, at the first event publisher via an event application program interface (API), the second metadata structure from the asynchronous communication repository using an asynchronous communication protocol;

retrieve, at the first event publisher and based on the second attributes describing the second metadata structure, the second dataset from the second event publisher;

generate, at the first event publisher, the first dataset based on the second dataset;

determine, at the first event publisher, the first metadata structure based on the first dataset; and send the first metadata structure from the first event publisher to the asynchronous communication repository via the event API.

11. The computing apparatus of claim 10, wherein the asynchronous communication protocol comprises a directive to only store, at the asynchronous communication repository, the first metadata structure determined based on a most-recently published first dataset.

12. The computing apparatus of claim 10, wherein the first metadata structure and the second metadata structure each include attributes comprising a version, a time period, a dataset name, a path location, a dataset format, or a combination thereof.

13. The computing apparatus of claim 12, wherein the attributes of the first metadata structure and the attributes of the second metadata structure are different.

14. The computing apparatus of claim 12, wherein the first dataset is published multiple times based on a run frequency, and the plurality of program instructions further cause the computing apparatus to:
update the attributes of the first metadata structure based on a most-recently published first dataset.

15. The computing apparatus of claim 10, wherein the first plurality of publication instructions further comprise a directive to retrieve a third dataset published by a third event publisher, the asynchronous communication repository is further configured to store a third metadata structure including a plurality of third attributes describing the third dataset, and the plurality of program instructions further cause the computing apparatus to:
receive, at the first event publisher via the API, the third metadata structure from the asynchronous communication repository using the asynchronous communication protocol; and
retrieve, at the first event publisher and based on the third attributes describing the third metadata structure, the third dataset from the third event publisher; wherein the first dataset is generated based on the second dataset and the third dataset.

16. The computing apparatus of claim 10, wherein the first plurality of publication instructions further include a first run frequency at which to publish the first dataset.

17. The computing apparatus of claim 16, wherein the plurality of program instructions further cause the computing apparatus to:
receive, at the first event publisher, a second plurality of publication instructions to publish an updated first dataset, wherein the second plurality of publication instructions comprise a second run frequency that is different from the first run frequency.

18. The computing apparatus of claim 17, wherein the first metadata structure includes attributes comprising a version, a time period, a dataset name, a path location, a dataset format, or a combination thereof, and the plurality of program instructions further cause the computing apparatus to:
update the attributes of the first metadata structure based on the updated first dataset.

19. A non-transitory computer storage medium encoded with a computer program, the computer program comprising a plurality of program instructions that when executed by one or more processors cause the one or more processors to perform operations comprising:
receive, at a first event publisher, a plurality of publication instructions to publish a first dataset, the plurality of publication instructions comprising a directive to retrieve a second dataset published by a second event publisher, a directive to determine a first metadata structure including a plurality of first attributes describing the first dataset, and a directive to send the first metadata structure to an asynchronous communication repository for storage, wherein the asynchronous communication repository is configured to store a second metadata structure including a plurality of second attributes describing the second dataset;

receive, at the first event publisher via an event application program interface (API), the second metadata structure from the asynchronous communication repository using an asynchronous communication protocol;

retrieve, at the first event publisher and based on the second attributes describing the second metadata structure, the second dataset from the second event publisher;

generate, at the first event publisher, the first dataset based on the second dataset;

determine, at the first event publisher, the first metadata structure based on the first dataset; and send the first metadata structure from the first event publisher to the asynchronous communication repository via the event API.

20. The non-transitory computer storage medium of claim 19, wherein the asynchronous communication protocol comprises a directive to only store, at the asynchronous communication repository, the first metadata structure determined based on a most-recently published first dataset.

* * * * *